(12) United States Patent
Barry et al.

(10) Patent No.: US 12,370,485 B2
(45) Date of Patent: *Jul. 29, 2025

(54) FOLDING AIR FILTER ASSEMBLIES (71) Applicant: FILTEREASY, LLC, Raleigh, NC (US)

(72) Inventors: Kevin James Barry, Raleigh, NC (US); Thaddeus Worth Tarkington, Raleigh, NC (US); Aly Khalifa, Raleigh, NC (US)

(73) Assignee: FILTEREASY, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,608

(22) Filed: May 6, 2024

(65) Prior Publication Data

US 2024/0286073 A1     Aug. 29, 2024

Related U.S. Application Data

(63) Continuation of application No. 17/204,609, filed on Mar. 17, 2021, now Pat. No. 11,975,286, which is a
(Continued)

(51) Int. Cl.
    B01D 46/52        (2006.01)
    B01D 46/00        (2022.01)

(52) U.S. Cl.
    CPC ....... B01D 46/522 (2013.01); B01D 46/0016 (2013.01)

(58) Field of Classification Search
None
See application file for complete search history.

(56) References Cited

U.S. PATENT DOCUMENTS

| | | | |
|---|---|---|---|
| 1,887,737 A | 11/1932 | Wilfred | |
| 2,201,628 A | 5/1940 | Russell | |

(Continued)

FOREIGN PATENT DOCUMENTS

| | | | | |
|---|---|---|---|---|
| CN | 111085021 A | * | 5/2020 | ........... B01D 29/016 |
| CN | 108355425 B | * | 1/2021 | ............. B01D 45/08 |

(Continued)

OTHER PUBLICATIONS

WIPO; International Preliminary Report for Patentability for International Patent Application No. PCT/US19/55094 dated Apr. 22, 2021, 7 pages.

(Continued)

*Primary Examiner* — Brit E. Anbacht
(74) *Attorney, Agent, or Firm* — NK Patent Law (57) ABSTRACT

Collapsible filter assembly includes a filter medium element and a frame at least partially surrounding the filter medium element. The frame and filter media element are configured to vary in at least two dimensions by folding or unfolding. In at least on example, the filter medium element is rectangularly pleated or round pleated. Upon removal of the filter assembly from packaging and other restraints, the filter assembly may naturally expand with regard to footprint and volume, with some manual assistance being expected of a typical user in unfolding from an area-reduced configuration to an area-expanded configuration, and from a volumetrically reduced configuration to a volumetrically expanded configuration.

20 Claims, 4 Drawing Sheets

Related U.S. Application Data continuation of application No. PCT/US2019/055094, filed on Oct. 8, 2019.

(60) Provisional application No. 62/742,708, filed on Oct. 8, 2018.

(56) References Cited

U.S. PATENT DOCUMENTS

| | | | |
|---|---|---|---|
| 2,943,700 | A | 7/1960 | Bub |
| 3,810,350 | A | 5/1974 | Scholl |
| 4,925,468 | A | 5/1990 | Kishi |
| 5,273,563 | A | 12/1993 | Pasch |
| 5,273,564 | A | 12/1993 | Hill |
| 5,364,458 | A | 11/1994 | Burnett |
| 5,743,927 | A | 4/1998 | Osendorf |
| 5,797,975 | A | 8/1998 | Davis |
| 6,007,596 | A | 12/1999 | Rosen |
| 6,039,777 | A | 3/2000 | Lee |
| 6,238,561 | B1 | 5/2001 | Liu |
| 7,410,520 | B2 | 8/2008 | Nowak |
| 7,452,396 | B2 | 11/2008 | Terlson |
| 7,537,630 | B2 | 5/2009 | Schuld |
| 7,537,632 | B2 | 5/2009 | Miller |
| 7,776,123 | B2 | 8/2010 | Lawrence |
| 8,021,454 | B2 | 9/2011 | Braunecker |
| 8,157,881 | B1 | 4/2012 | Anoszko |
| 8,834,611 | B1 | 9/2014 | Dimicelli |
| 10,245,542 | B2 | 4/2019 | Knuckles |
| 10,427,079 | B2 | 10/2019 | Barry |
| 2001/0020512 | A1 | 9/2001 | Heilmann |
| 2002/0100264 | A1 | 8/2002 | Rivera |
| 2004/0065066 | A1 | 4/2004 | Mertz |
| 2005/0204922 | A1 | 9/2005 | Wu |
| 2007/0204576 | A1 | 9/2007 | Terlson |
| 2008/0047240 | A1 | 2/2008 | Trautmann |
| 2008/0066436 | A1 | 3/2008 | Magee |
| 2008/0148698 | A1 | 6/2008 | Nowak |
| 2009/0019824 | A1 | 1/2009 | Lawrence |
| 2009/0249755 | A1 | 10/2009 | O'Leary |
| 2009/0301044 | A1 | 12/2009 | Miller |
| 2009/0320426 | A1 | 12/2009 | Braunecker |
| 2013/0067877 | A1 | 3/2013 | Griffiths |
| 2013/0133301 | A1 | 5/2013 | Sproule |
| 2013/0174742 | A1 | 7/2013 | Gelb |
| 2015/0047507 | A1 | 2/2015 | Fox |
| 2015/0047508 | A1 | 2/2015 | Sanocki |
| 2015/0267927 | A1* | 9/2015 | Zhang ................ B01D 46/521 55/497 |
| 2017/0151522 | A1 | 6/2017 | Knuckles |
| 2018/0021716 | A1 | 1/2018 | Li |
| 2021/0106936 | A1 | 4/2021 | Portelli |
| 2022/0023791 | A1 | 1/2022 | Fralin |
| 2024/0123267 | A1* | 4/2024 | Rich ................... A62B 18/10 |

FOREIGN PATENT DOCUMENTS

| | | |
|---|---|---|
| EP | 1616736 A1 | 1/2006 |
| EP | 3863750 A1 | 8/2021 |
| WO | 2019169070 A1 | 9/2019 |
| WO | 2020210497 A1 | 10/2020 |

OTHER PUBLICATIONS

ISA/KR; International Search Report and Written Opinion for International Patent Application No. PCT/US19/55094 dated Jan. 23, 2020, 10 pages.
EPO; The Extended European Search Report for European Patent Application No. 19761230.2 mailed Sep. 29, 2021, 7 pages.
EPO; Extended European Search Report for corresponding European Patent Application No. 19871822.3, mailed Mar. 28, 2022, 9 pages.
EPO; Extended European Search Report for European Patent Application No. 20787129.4 dated Dec. 2, 2022, 8 pages.
EPO; Examination Report for European Patent Application No. 19 871 822.3 dated Mar. 13, 2023, 4 pages.
EPO; Examination Report for European Patent Application No. 19 871 822.3 dated Sep. 18, 2023, 3 pages.
USPTO, Non-Final Office Action for corresponding U.S. Appl. No. 17/204,609 dated Jun. 14, 2023, 9 pages.

* cited by examiner

FOLDING AIR FILTER ASSEMBLIES

CROSS-REFERENCE TO RELATED APPLICATIONS

This application is a continuation of U.S. patent application Ser. No. 17/204,609, filed on Mar. 17, 2021, entitled "FOLDING AIR FILTER ASSEMBLIES", which is a continuation of Patent Cooperation Treaty Application No. PCT/US19/55094, filed on Oct. 8, 2019, entitled "FOLDING AIR FILTER ASSEMBLIES", which claims priority to U.S. Provisional Patent Application No. 62/742,708, filed on Oct. 8, 2018, entitled "FOLDABLE AIR FILTER ASSEMBLIES", the entire contents of each of which are incorporated by reference herein.

TECHNICAL FIELD

The present disclosure relates to air filtration technologies; in particular, the present disclosure relates to foldable air filter assemblies for reduced configurations for storage and shipping convenience.

BACKGROUND

A typical home or business HVAC air-handling system requires periodic or occasional replacement of air filters. Consumers are burdened either with frequent trips to purchase replacement filters or with acquiring and storing a number of replacement filters. However, HVAC air filters are generally large and somewhat fragile. Consumers are also burdened with finding appropriately sized replacement filters, and because air-handling systems have dimensions that vary from unit to unit and there is no specific industry standardization in place. Indeed, success in finding the needed correct size replacement filter is not assured on any given trip to a brick-and-mortar retail location where filters are stocked on shelves and sold to consumers in the traditional point-of-sale (POS) fashion.

Compromises are thus forced upon consumers, including, for example, the use of filters that are bit small or large in one or both rectangular dimensions, and frustrated consumers even delay or neglect suggested periodic filter replacement. When air driven through an air-handling system bypasses an improperly fitted filter, airborne matter is not optimally trapped at the filter, which can permit the accumulation of matter on HVAC system components and cause or aggravate respiratory problems. When filter replacement schedules are missed, filter blockage by matter/particles accumulated in an old filter can increase system power consumption and wear; it can also harbor microbial growth, which can adversely affect respiratory health. Further, the dimensions as well as the delicate nature of traditional air filters pose some challenges. For example, consumers can find it difficult to handle and transport purchased filters without causing damage to the product. Retailers face additional problems with storing/stocking large and fragile products such as replacement filters; retailers are further forced to make critical calculations regarding stocking a range of filter sizes whereby the shelf-space available for each filter size may be minimized.

Accordingly, opportunities exist for improvements that overcome the above-noted shortcomings of the art.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a collapsible air-filter assembly comprises a filter medium element, and a frame at least partially surrounding the filter medium element. The frame and filter medium element are configured to vary in at least one dimension by folding or unfolding.

According to one or more embodiments, the frame comprises a top shell and a bottom shell, and wherein the filter medium element is placed between the top shell and bottom shell.

According to one or more embodiments, the filter medium element is rectangular pleated.

According to one or more embodiments, the filter medium element is trapezoidal pleated.

According to one or more embodiments, the filter medium element is pleated, wherein the pleats are generally rounded.

According to one or more embodiments, in a configuration expanded by area and volume, the filter medium element has rectangular channels extending from end to end.

According to one or more embodiments, the assembly further comprises edge treatments nestled with the filter medium element.

According to one or more embodiments, channel sidewalls unfold upward from a flattened configuration to a standing configuration when the air-filter assembly is volumetrically expanded.

According to one or more embodiments, when twice folded in two dimensions, the air-filter assembly is halved in length and halved in width.

In at least one embodiment, a variable filter assembly comprises a filter medium element, and a frame at least partially surrounding the filter medium element. The frame and filter media element are configured to be reducible in at least one dimension via a non-planar action. The filter medium element is pleated.

According to one or more embodiments, the pleats are generally rectangular.

According to one or more embodiments, the pleats are generally trapezoidal.

According to one or more embodiments, the pleats are generally rounded.

According to one or more embodiments, edge treatments assist in expansion of the pleats.

According to one or more embodiments, the variable filter assembly also includes a scrim layer extending approximately parallel to a major plane of the filter medium element and contacting the filter medium element, wherein the scrim layer comprises a flat top layer and bottom layer.

According to one or more embodiments, the scrim layer is configured to have a tensile and bending stiffness such that the pleats are encouraged to rebound to an original shape profile in an expanded configuration of the variable filter assembly.

According to one or more embodiments, the variable filter assembly further includes a frame wrap surrounding edges of the frame.

According to one or more embodiments, the frame wrap is configured to seal the ends of a pleated portion of the filter.

According to one or more embodiments, the frame wrap is configured to reduce noise associated with the filter moving when airflow is turned on or off.

In at least one embodiment a collapsible air filter is provided. In a collapsed configuration, the collapsible air filter is reduced in the dimension predominantly parallel to the direction of air flow. In an expanded configuration, the collapsible air filter is increased in the dimension predominantly parallel to the direction of air flow. In switching from the collapsed configuration to the expanded configuration, a series of pleats of a filter media of the collapsible air filter is expanded thus increasing the effective filter media volume.

According to one or more embodiments, a perforated or otherwise open sheet of resilient material laminated to the filter media assists in the expansion of the pleats.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTION

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless described or implied as exclusive alternatives, features throughout the drawings and descriptions should be taken as cumulative, such that features expressly associated with some particular embodiments can be combined with other embodiments.

FIGS. 1-5A illustrate a collapsible filter assembly 100, according to at least one embodiment, unfolding in ordered stages from an area-reduced configuration in which its footprint is most reduced (as illustrated, for example, in FIG. 1), to an area-expanded configuration (as illustrated, for example, in FIG. 5A), in which its footprint is most expanded. To prepare the collapsible filter assembly 100 for use, a typical user may remove the filter assembly 100 from product packaging 102 in the area-reduced configuration of FIG. 1, which is preferable for storage and shipping purposes due to the reduced footprint and/or volume. Once removed from the product packaging 102, the collapsible filter assembly 100 is expandable to the area-expanded configuration of FIG. 5A.

Figures 6A, 6B:
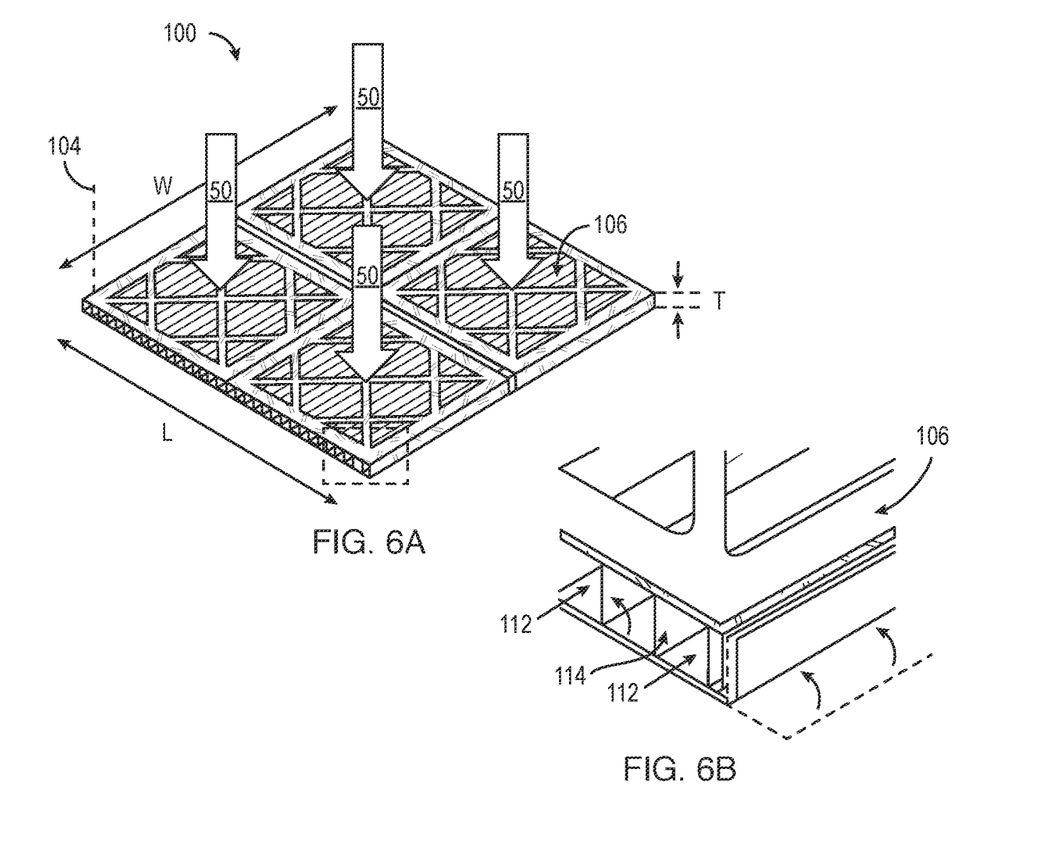
FIG. 6A is a perspective view of the collapsible filter assembly of FIG. 1 further volume expanded by thickness relative to the configuration of FIG. 5A, according to one or more embodiments of the presently disclosed subject matter.
FIG. 6B is an expanded view of a corner portion of the collapsible filter assembly in the configuration of FIG. 6A, according to one or more embodiments of the presently disclosed subject matter.

The collapsible filter assembly 100 further expands volumetrically as shown in FIGS. 6A-6B, which illustrate a sixth configuration of the filter assembly 100, which is preferable for typical use as an air filter. As the collapsible filter assembly 100 ultimately has some degree of material flexibility and deformation, particularly when air flow pressures are applied, its operational configuration may be found as somewhat flexed, bulged, or compressed relative to the depictions in the drawings. Nonetheless, the collapsible filter assembly 100 can be described as assuming an approximately planar configuration in the fully expanded configuration of FIG. 6A.

The footprint of the collapsible filter assembly 100 is understood as the area, which can be determined, for example, by multiplication of the length L and width W of the filter assembly 100. The footprint of the filter assembly 100 in the drawings is rectangular, and can vary in dimensions. Although the length L and width W are only particularly labeled in the drawings in FIG. 6A, the footprint or area of the filter assembly has an effective lesser area in any of the configurations of FIGS. 1 and 3, for example. The length L and width W are taken in the filter plane, which is generally the plane perpendicular to the direction in which air will flow when the filter assembly is expanded and in use, such that the air flows 50 (FIG. 6A) are directed approximately parallel to the normal axis 104 of the filter plane. The normal axis 104 is understood as orthogonal to the length L and width W dimensions, and the thickness T of the filter assembly is understood as taken along the normal axis 104. The volume of the collapsible filter assembly 100 is understood as approximately the multiplicative product of the length L, width W, and thickness T. In normal use, the air flows 50 pass through the thickness T of the filter assembly FIG. 6A within the fully expanded area of the filter assembly as shown in FIG. 6A.

In transitioning from a packaged configuration (as shown, for example, in FIG. 1) to a configuration as ready for use (as shown, for example, in FIG. 6A), the collapsible filter assembly is unfolded along engineered fold lines defined along one or more dimensions, such that each fold during the unfolding process successively increases the footprint. Accordingly, during the collapsing process, for example during the manufacturing of the collapsible filter assembly, the collapsing filter assembly is folded along the engineered fold lines such that each fold during the folding process successively decreases the footprint.

The engineered fold lines can be rendered, for example, by thinning or stamping the material, embossing the material, perforating the material, and/or by adding a hinging structure, feature, or material. The quarter-area-reduced configuration of FIG. 1 can be described as a twice folded configuration having folds in two dimensions relative to the area-expanded configuration of FIG. 5A. Similarly, the fractionally-reduced-area configuration of FIG. 3 can be described as a once folded configuration having a fold in one dimension relative to the area-expanded configuration of FIG. 5A.

The illustrated embodiment of the filter assembly 100 is designed to be twice folded, with one-fold each in two dimensions. In other embodiments, the filter assembly is configured such that it can be folded three or more times. For example, at least one filter assembly is designed to be folded once in one of the two dimensions (i.e., L and W), and folded twice in the other of the two dimensions. For example, an air filter assembly having an expanded footprint of dimensions 24 by 30 inches, can be folded three times to have a reduced footprint of approximate dimensions 10 by 12 inches. Accordingly, a filter assembly according to these descriptions can be folded once or any number of times.

Figures 1, 2, 3, 4:
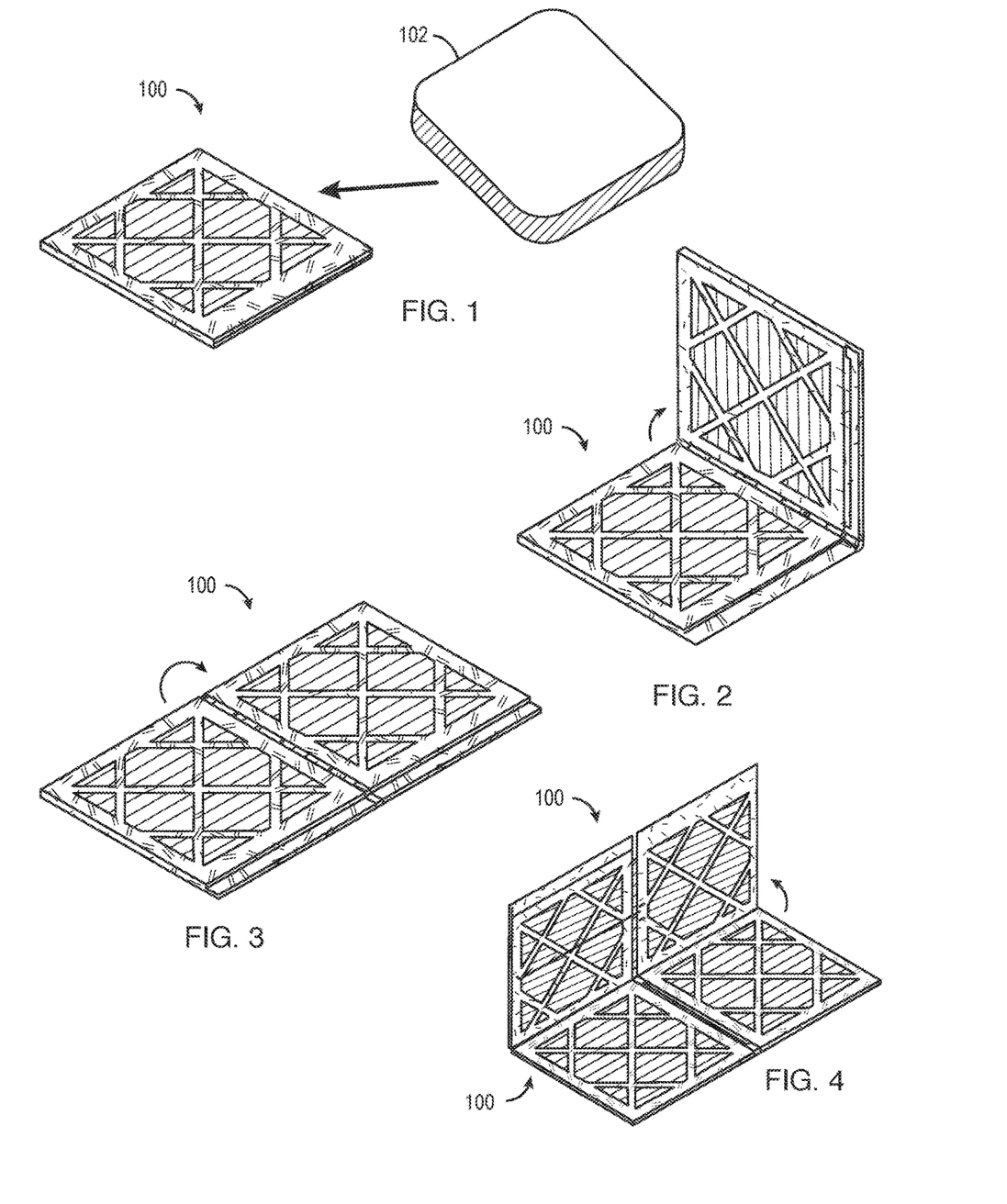
FIG. 1 is a perspective view of a collapsible filter assembly, according to at least one embodiment, in a reduced (i.e., collapsed) first configuration as removed from product packaging, according to one or more embodiments of the presently disclosed subject matter.
FIG. 2 is a perspective view of the collapsible filter assembly of FIG. 1 unfolding in a first dimension, according to one or more embodiments of the presently disclosed subject matter.
FIG. 3 is a perspective view of the collapsible filter assembly of FIG. 1 once unfolded and thereby doubled in length and area relative to the first configuration, according to one or more embodiments of the presently disclosed subject matter.
FIG. 4 is a perspective view of the collapsible filter assembly of FIG. 1 unfolding in a second dimension, according to one or more embodiments of the presently disclosed subject matter.
Figure 5A:
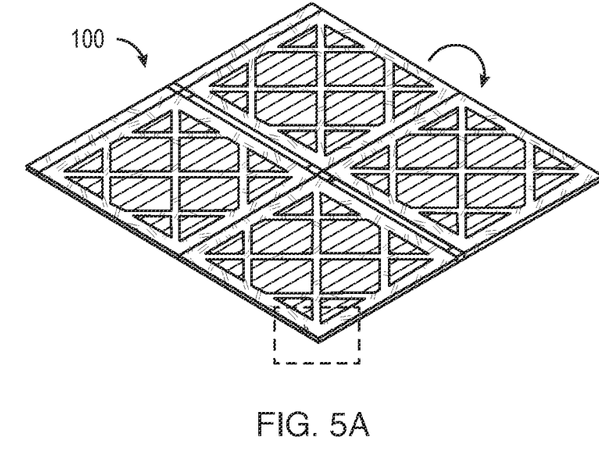
FIG. 5A is a perspective view of the collapsible filter assembly of FIG. 1 twice unfolded and thereby doubled in length, doubled in width, and quadrupled in area relative to the first configuration, according to one or more embodiments of the presently disclosed subject matter.
Figure 5B:
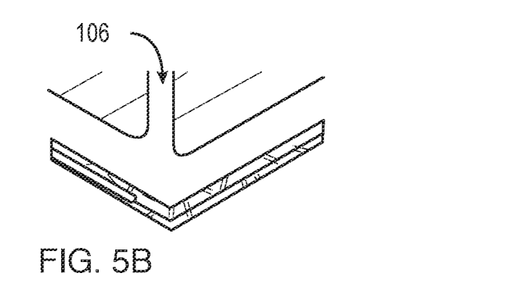
FIG. 5B is an expanded view of a corner portion of the collapsible filter assembly in the configuration of FIG. 5A, according to one or more embodiments of the presently disclosed subject matter.

In various embodiments, transitioning of the collapsed filter assembly for use can also include permitting the collapsible filter assembly to expand in thickness, for example, as shown in transitioning from the configuration of FIGS. 5A-5B to the configuration of FIGS. 6A-6B. The illustrated embodiment of the filter assembly is particularly advantageous in that regard, with a rectangular or trapezoidal pleated filter medium element 110 and edge treatments 120 as further described below with reference to FIG. 7. In this particular example the filter assembly 100 has approximately rectangular shaped channels 112 (see FIG. 7) terminating at opposing ends. This design facilitates the top side 106 of the filter assembly 100 rocking upward as internal channel walls 114 unfold upward from a flattened configuration (FIG. 5B) to standing configuration (FIG. 6B). The pleated filter medium and edge treatments can be described as having a rectangular-wave shape or a trapezoidal-wave shape as opposed, for example, a triangle wave shape. Thus, the approximately rectangular or trapezoidal pleated filter medium and edge treatments are particularly advantageous for third dimension or thickness (T) expansion/standing (from FIG. 5B to FIG. 6B) and reduction/flattening (FIG. 6B to FIG. 5B) without damaging the components of the filter assembly.

Figure 7:
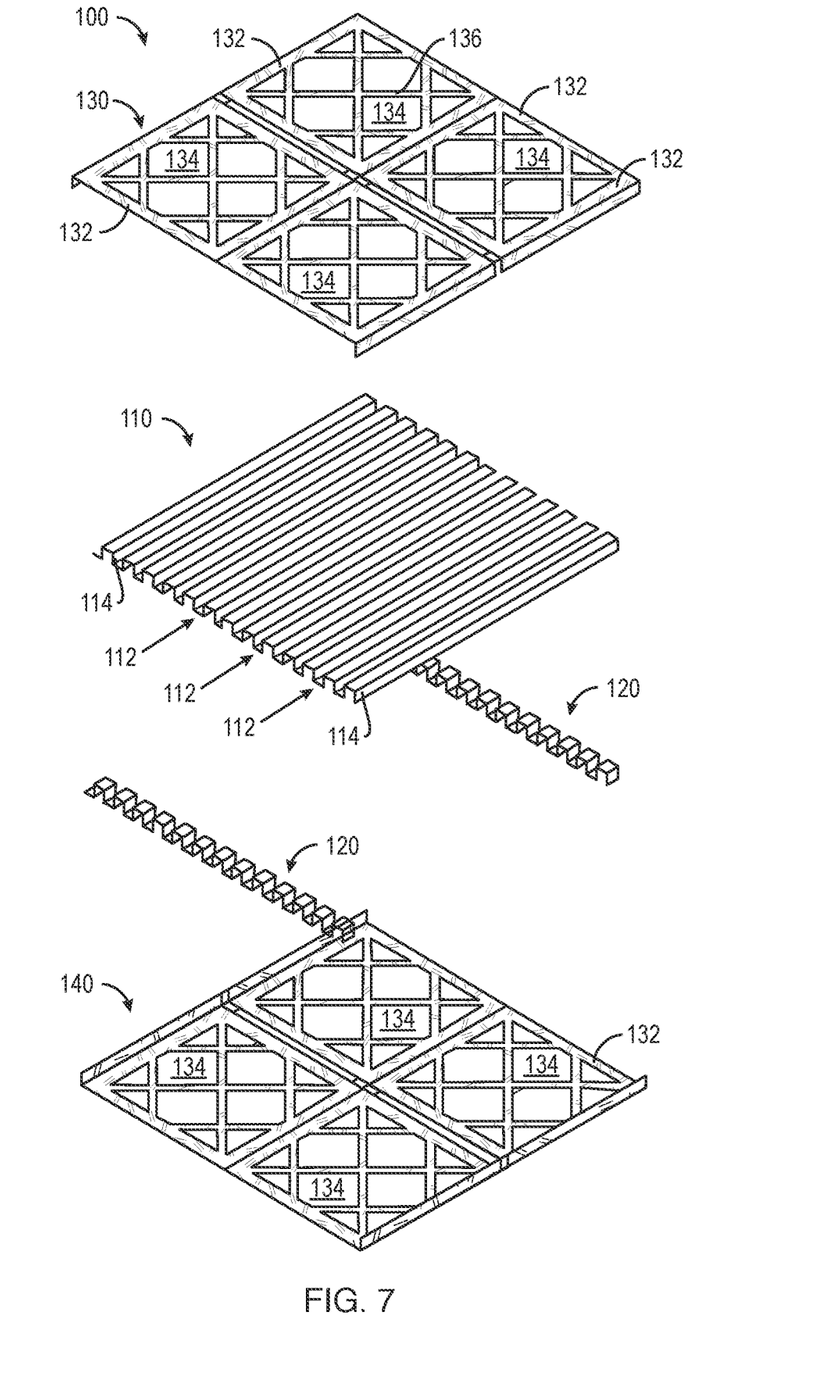
FIG. 7 is an exploded perspective view of the collapsible filter assembly of FIG. 1, according to one or more embodiments of the presently disclosed subject matter.
Figure 8:
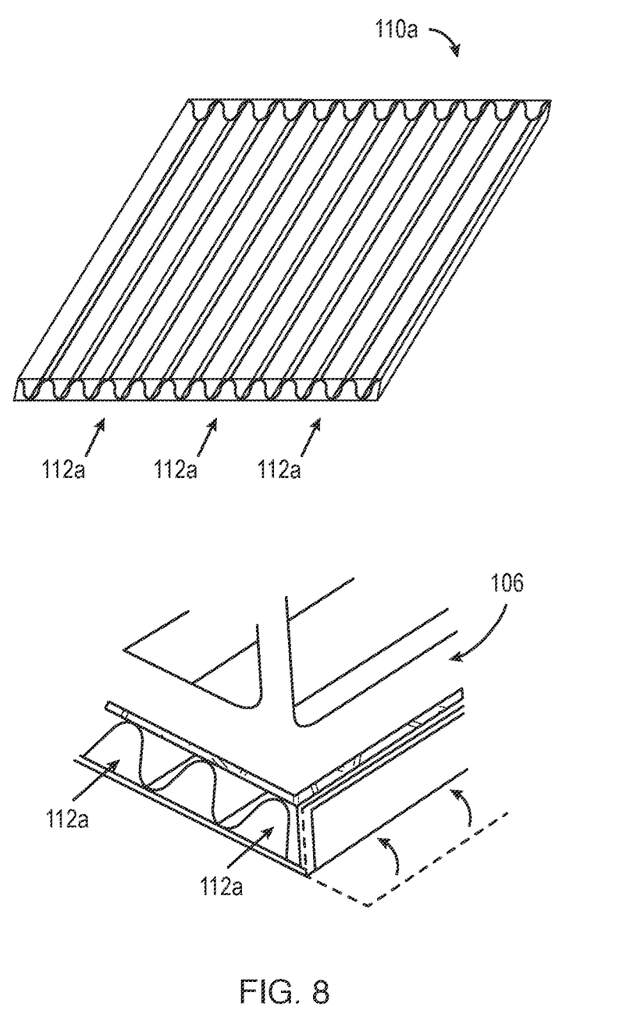
FIG. 8 is a perspective view of a filter medium element having pleats with a rounded shape that forms part of a collapsible filter assembly, according to one or more embodiments of the presently disclosed subject matter.

In some alternate embodiments, for example, as shown in FIG. 8, filter medium element 110a can include rounded pleat shape channels 112a (instead of rectangular shaped channels 112 as shown, for example, in FIG. 7). As illustrated in FIG. 8, in some embodiments, the collapsible filter assembly as disclosed herein can include filter medium element 110a having an original shape profile comprising a rounded pleat shape by way of rounded pleat shape channels 112a. The approximately rounded pleated filter medium and corresponding edge treatments are particularly advantageous for third dimension or thickness (T) expansion/standing and reduction/flattening without damaging the components of the filter assembly.

Conventional air filter pleat shapes are typically triangular, and conventional triangular pleat shapes are stable, strong, and resistant to collapsing; accordingly, when collapsed, convention triangular pleat shapes can suffer from a lack of controlled and repeatable collapse and rebound to their original shape. In contrast to conventional air filter with triangular pleat shape, the present invention can include a rectangular-wave shape, a trapezoidal-wave shape, or a rounded pleat shape wherein the respective pleat shape profile can encourage collapse in a controlled and repeatable manner.

It is noted that there is an additional configuration where the filter only collapses in the thickness "T" dimension, in a similar method as described here, in applications where it is unnecessary or undesirable to additionally reduce the filter in the "W" and "L" dimensions. In such embodiments, the filter assembly 100 could be removed from product packaging or other compressing constraint in the configuration of FIG. 5A and then would be expanded to the configuration of FIG. 6A.

FIG. 7 is an exploded perspective view of the collapsible filter assembly so as to illustrate exemplary components, according to at least one embodiment. As shown, the collapsible filter assembly has a top shell 130, the filter medium element 110, edge treatments 120, and a bottom shell 140. The components of the filter assembly 100 are designed to align the engineered folds in the flattened configuration of FIG. 5B to facilitate folding and unfolding.

The filter assembly 100 is referenced herein as a collapsible filter assembly 100 according to the rebound tendencies of the materials used and according to the design, which includes, for example, the rectangularly pleated filter medium element 110 and edge treatments 120. In other embodiments, the filter medium can have pleats that are square, trapezoidal, rounded, and/or saw-toothed. Upon removal of the filter assembly 100 from packaging and other restraints, the filter assembly 100 naturally expands with regard to foot print and volume, with some manual assistance being expected of a typical user in unfolding from the area-reduced configuration of FIG. 1, to the area-expanded configuration of FIG. 5A, and to the volumetrically expanded configuration of FIG. 6A. It should be understood that the transitioning from a reduced configuration (FIG. 1) freed from packaging to an expanded configuration for use (FIG. 6A) may depart from the stages and order of steps suggested in considering the drawings as chronologically ordered (FIGS. 1 through 6A). Some degree of unflattening (FIG. 5A to FIG. 6A) may occur even as the folded filter assembly 100 is removed. Each user may treat the filter assembly 100 differently and thus each unpackaging and deployment may progress with variations accordingly.

Whereas the figures illustrate a certain dimension of the pleat height, it is to be noted that there is no particular specific aspect ratio between pleat height and pleat width that is required for the invention to operate as intended. Accordingly, in various embodiments, the aspect ratio between pleat height and pleat width can be any suitable ratio values. For example, the aspect ratio between pleat height and pleat width can be 1:0.5, 1:1, 2:1, 3:1, 4:1, 5:1, 6:1, 7:1 or any other similar ratio values. Inventors have accordingly identified that while the shape of the pleat affects the effectiveness of the collapsible filter assembly to a considerable level, the aspect ratio between pleat height and pleat width does not affect the effectiveness of the collapsible filter assembly as much.

The top shell and bottom shell have matching footprints to form a frame around the filter medium element. In one embodiment, each shell has linear outer edge strips 132 along the margins of the filter assembly 100 and four sub-frame areas 134; each shell also includes four inner edge strips. In one embodiment, diagonally extending stringers 136 span each sub-frame area to stiffen the filter assembly 100 and support the filter medium element across the otherwise open areas of the top shell and bottom shell; stringers 136 further operate to provide a degree of protection to the filter from mechanical damage.

The top shell and bottom shell are to be constructed of foldable and resilient materials to as to permit reduction and expansion and still provide structural support to the filter assembly 100 which may span, with or without additional external support, the interior flow channel of an air duct or other air-handling system interior space in use and under the load of air pressure applied. The top shell and bottom shell may be constructed of polymer, cardboard polyester, polymer and/or plastic. Cardboard or other durable paper or wood-fiber based product may be used in some embodiments.

The edge treatments are constructed of resilient materials having some degree of return force when flattened so as to naturally rebound or unfold to the heightened configuration of FIGS. 6A and 6B when released from the flattened configuration of FIGS. 5A and 5B. For example, plastic and/or spring steel may be used.

The filter medium element is generally porous and may be layered and may include woven and non-woven materials such as paper, fabrics, piles, felts, mesh, and foams. The filter medium element may include materials that are melt blown, spun bound, carded, expanded, extruded or molded. The filter medium element may include materials having antimicrobial, olfactory, and/or chemical absorbent properties.

The product packaging 102 may be a box, bag, envelope or other container and may be padded. The outer dimensions of the product packaging 102 may be selected to conform to particular shipping and postage standards for convenience and cost savings or for a particularly desired retail store presence.

Further, in some embodiments, the collapsible filter assembly can further include a scrim layer or other similar stiff net-like material comprising a flat top layer and/or a flat bottom layer, with the filter medium element being bounded by the flat top layer and/or the flat bottom layer of the scrim layer, for example. In some embodiments, the scrim layer can be configured to have a tensile disposition with bending stiffness whereby the scrim encourages the pleats to rebound to an original/expanded shape profile when in an expanded configuration. Accordingly, in various embodiments, the pleated filter medium element can be secured to one or more sheets of the scrim layer. The tensile and bending stiffness of the scrim layer can provide the ability of the pleats to rebound back to their original shape when the collapsible filter assembly is transferred from a collapsed configuration (as shown, for example, in FIG. 1) to an expanded configuration (as shown, for example, in FIG. 5A). For example, a higher stiffness scrim layer can be beneficial for pleat rebound. A stiff scrim layer can also provide additional sturdiness to the filter and reduce deflection of the filter assembly when under load from airflow when in use. In some alternate embodiments, strips or supports can be reinforced and connected to the frame as an alternative to the scrim layer described above.

In some embodiments, the collapsible filter assembly can further include a frame wrap provided around the edges of the frame of a collapsible filter assembly. In various embodiments, the frame wrap around frame edges can encase, surround, or otherwise be attached to the frame of the collapsible filter assembly. The frame wrap around frame edges can be used for functional purposes. For example, frame wrap around frame edges can help seal the ends of the pleated portion of the filter; alternately, or in addition, the frame wrap around frame edges can provide a more compliant surface to help achieve a better seal when the filter assembly is installed in an HVAC register. The frame wrap around frame edges can also help provide a tight-fit to the register to assist installation, were the register holds the filter in place when closing the grating. The frame wrap around frame edges can also prevent the filter assembly from moving up and down when the flow of air is turned on or off. In some embodiments, the frame wrap can have a geometry that creates an interference fit and further allows for collapse and expansion for packaging, such as single-bend accordion-style geometry. In further embodiments, the frame wrap material can be stiff (for example, the frame wrap material can comprise neoprene in one embodiment) such that elements of the air filter assembly do not need to be secured to each other at the corners. Accordingly, in various embodiments, the frame wrap can be configured to seal the ends of the pleated portion of the filter. The frame wrap can also be configured to provide a compliant surface to for a semi-seal to the register, and to further provide a compliant tight-fit to the register to assist installation.

In some embodiments, the frame wrap is configured to reduce noise associated with the filter moving when airflow is turned on or turned off. The partial seal created by the frame wrap as well as the disruption to air flow resulting from the frame wrap can operate to reduce and even eliminate the whistling/noise otherwise generated when airflow is turned on or turned off. Through experiments, the inventors have discovered that the reduction in the noise or whistling is accomplished by fabricating the frame wrap from a material that includes sufficient loft such as, for example, felt, flannel, or a similar other material. Through experiments, the inventors have also discovered that this benefit (i.e., the reduction in noise/whistling) is generally not obtained when the filter medium element is made up of a material such as a cotton sheet. Indeed, reduction of noise or whistling by the provision of a frame wrap as discussed above is not limited to collapsible filter assemblies; in other words, reduction of noise or whistling by the provision of a frame wrap as discussed above can also be obtained in conventional/existing non-collapsible filter assemblies that include cardboard frames, for example.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A collapsible air-filter assembly comprising:
   a filter medium element; and
   a frame positioned to at least partially surround the filter medium element,
   wherein the filter medium element is configured to vary in at least one dimension by folding or unfolding;
   wherein the assembly is operable to move from a folded position to an unfolded position along at least one engineered fold line; and
   wherein, when the assembly is in the unfolded position, the filter medium element is configured to expand volumetrically from a flattened configuration to a standing configuration.

2. The assembly of claim 1, wherein the frame comprises a top shell and a bottom shell, and wherein the filter medium element is placed between the top shell and bottom shell.

3. The assembly of claim 1, wherein the filter medium element is rectangular pleated or trapezoidal pleated.

4. The assembly of claim 1, wherein the filter medium element is pleated, wherein the pleats are generally rounded.

5. The assembly of claim 1, wherein, in a configuration expanded by area and volume, the filter medium element has rectangular channels extending from end to end.

6. The assembly of claim 5, further comprising edge treatments nestled with the filter medium element.

7. The assembly of claim 5, wherein channel sidewalls unfold upward from a flattened configuration to a standing configuration when the air-filter assembly is volumetrically expanded.

8. The assembly of claim 1, wherein, when twice folded in two dimensions, the air-filter assembly is halved in length and halved in width.

9. A variable filter assembly comprising:
   a filter medium element; and
   a frame positioned to at least partially surround the filter medium element,
   wherein the frame and filter media element are configured to be reducible in at least one dimension via a non-planar action, wherein the non-planar action includes folding;
   wherein the assembly is operable to move from a folded position to an unfolded position; and
   wherein, when the assembly is in the unfolded position, the filter medium element is configured to expand volumetrically from a flattened configuration to a standing configuration.

10. The variable filter assembly according to claim 9, wherein the filter medium element is pleated, wherein the pleats are generally rectangular.

11. The variable filter assembly according to claim 9, wherein the filter medium element is pleated, wherein the pleats are generally trapezoidal.

12. The variable filter assembly according to claim 9, wherein the filter medium element is pleated, wherein the pleats are generally rounded.

13. The variable filter assembly according to claim 9, wherein the filter medium element is pleated, wherein edge treatments assist in expansion of the pleats.

14. The variable filter assembly according to claim 9, further comprising a scrim layer extending approximately parallel to a major plane of the filter medium element and contacting the filter medium element, wherein the scrim layer comprises a flat top layer and bottom layer.

15. The variable filter assembly according to claim 14, wherein the filter medium element is pleated, wherein the scrim layer is configured to have a tensile and bending stiffness such that the pleats are encouraged to rebound to an original shape profile in an expanded configuration of the variable filter assembly.

16. The variable filter assembly according to claim 9, further comprising a frame wrap surrounding edges of the frame.

17. The variable filter assembly according to claim 16, wherein the filter medium element is pleated, wherein the frame wrap is configured to seal the ends of a pleated portion of the filter media element.

18. The variable filter assembly according to claim 16, wherein the frame wrap is configured to reduce noise associated with the filter moving when airflow is turned on or off.

19. A collapsible air filter including:
- a filter medium element; and
- a frame;
- wherein the frame is positioned to at least partially surround the filter medium element,
- wherein the collapsible air filter is operable to move from a collapsed configuration to an expanded configuration along at least one engineered fold line,
- wherein, when in the collapsed configuration, the collapsible air filter is reduced in the dimension predominantly parallel to the direction of air flow; and
- wherein, when in the expanded configuration, the collapsible air filter is increased in the dimension predominantly parallel to the direction of air flow.

20. A collapsible air filter according to claim 19, wherein the filter medium element includes a series of pleats, wherein a perforated or otherwise open sheet of resilient material laminated to the filter medium element assists in the expansion of the pleats.

\* \* \* \* \*